United States
Suverison

[11] 3,649,098
[45] Mar. 14, 1972

[54] SELF-RETAINING FIBER OPTIC LENS
[72] Inventor: Lyle B. Suverison, Fowler, Ohio
[73] Assignee: General Motors Corporation, Detroit, Mich.
[22] Filed: July 30, 1970
[21] Appl. No.: 59,639

[52] U.S. Cl. ..................................350/96 B, 350/175 NG
[51] Int. Cl. ..........................................G04b 5/14
[58] Field of Search ..........................350/96 R, 96 B, 175 NG

[56] References Cited

UNITED STATES PATENTS

| 3,569,933 | 3/1971 | Longenecker et al. | 350/96 B |
| 3,423,581 | 1/1969 | Baer | 350/96 B |

Primary Examiner—David Schonberg
Assistant Examiner—Robert L. Sherman
Attorney—W. E. Finken and W. A. Schuetz

[57] ABSTRACT

In a preferred form, this disclosure relates to a lens structure of a fiber optic assembly and which is adapted to be detachably connected to an apertured panel. The lens structure comprises a unitary body having forward and rearward socket portions having a common bottom wall which defines a lens portion for concentrating light being transmitted through a fiber optic bundle which is detachably connected via an end connector to the rearward socket portion. The forward socket portion has a side wall defining an axially extending recess through which the lens can be viewed and which includes a pair of deflectable fingers which cooperate with a flange on the side wall to detachably connect the lens structure to the apertured panel.

5 Claims, 6 Drawing Figures

Patented March 14, 1972

3,649,098

INVENTOR.
Lyle B. Suverison
BY
W. A. Schuetz
ATTORNEY

SELF-RETAINING FIBER OPTIC LENS

The present invention relates to a lens structure, and more particularly to a unitary lens structure of a fiber optic assembly and which is adapted to be detachably connected to an apertured panel.

Fiber optic assemblies are used to transmit light from a light source to a location remote from the light source. For example, in automotive vehicle applications they are used as an indicating means, such as to indicate when a light bulb is burned out.

Fiber optic assemblies usually comprise a fiber optic bundle, plastic lenses or socket bodies positioned adjacent the light source and the remote location to which the light is to be transmitted and end connectors attached to the opposite ends of the fiber optic bundles for connecting the same to the lenses or socket bodies. The fiber optic bundle includes a plurality of plastic or glass fibers or cores, each of which is coated with a substance having a lower light refraction index than the fiber or core, and an opaque flexible outer sheath or jacket, usually made of plastic, surrounding the fiber or cores for protecting the same.

The plastic lenses of the fiber optic assemblies serve to concentrate the light being transmitted by the fiber optic bundle to provide a high intensity indication of when a light is on. Known plastic lenses were mounted in recessed support structures or panels so that ambient light would not wash out or make it difficult to see the light being transmitted through the lens, such as when the latter were mounted in the recessed portions of the instrument panel in automotive vehicles.

The present invention provides a novel unitary lens structure which can be readily detachably connected to a panel, such as an instrument panel of an automotive vehicle, and which has a recessed lens portion so that ambient light does not wash out the light being transmitted through the lens portion. The unitary lens structure also has a retaining means thereon for retaining an end connector of a fiber optic bundle therein and at a predetermined distance or focal length from the lens portion. The novel lens structure also includes an anti rattle feature which allows the lens structure to be connected to an apertured panel irrespective of the tolerance variations, within limits, of the lens structure, the size of the aperture or thickness of the panel and such that it will not rattle when subjected to vibrations.

Accordingly, an important object of the present invention is to provide a new and improved unitary lens structure for use in a fiber optic assembly and which is readily connectable to an apertured panel and which includes a recessed lens portion for concentrating light being transmitted by the fiber optic assembly so that ambient light will not affect or substantially affect the visual indication being provided.

Another object of the present invention is to provide a new and improved lens structure for a fiber optic assembly and which is adapted to be detachably connected to an apertured panel, in which the lens structure comprises a unitary body having forward and rearward socket portions having a common bottom wall which defines a recessed lens portion for concentrating light being transmitted through a fiber optic bundle which is detachably connected via an end connector to the rearward socket portion, and in which the forward socket portion includes a pair of deflectable fingers which cooperate with a flange on the forward socket portion to detachably connect the lens structure to the apertured panel.

Yet another object of the present invention is to provide a new and improved lens structure, as defined in the next preceding object, and wherein the deflectable fingers are constructed and arranged such that they will securely connect the lens structure to the panel irrespective of the tolerance variations, within limits, of the lens structure, the size of the aperture and the thickness of the panel whereby the lens structure will not rattle when subjected to vibrational forces.

A further object of the present invention is to provide a new and improved lens structure, as defined in the preceding objects, and in which the rearward socket portion includes a retaining means comprising deflectable fingers having means for engaging the opposite sides of a circumferentially flanged end connector of the fiber optic assembly to retain the end connector therein and to space the end of the fiber optic bundle a predetermined distance or focal length from the lens portion.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which.

The present invention provides a novel unitary lens structure for use in a fiber optic assembly and which is adapted to be detachably connected to an apertured panel. Although the unitary lens structure could be used in various applications for providing a visual indication of light being transmitted through a fiber optic bundle, it will, for the purposes of illustration, be herein shown and described as being connected to an instrument panel of an automotive vehicle for providing an indication of when a light at a remote location is on.

Figure 1:
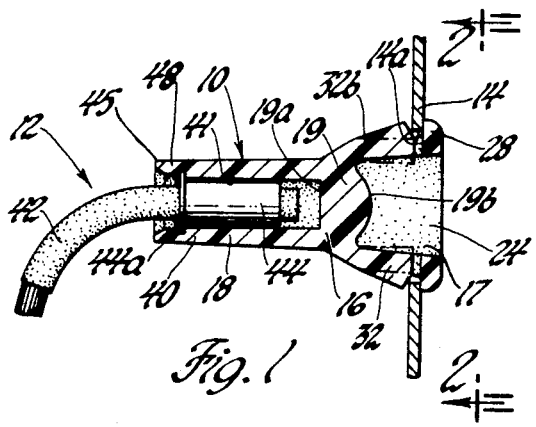
FIG. 1 is a vertical cross sectional view of the unitary lens structure of the present invention and showing the same connected to an apertured panel and to an end connector secured to a fiber optic bundle.
Figure 2:
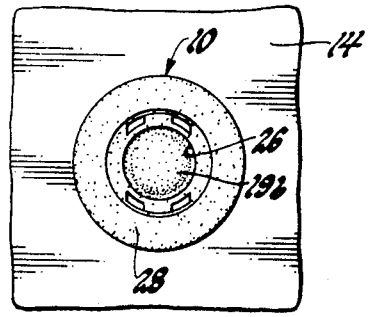
FIG. 2 is a fragmentary elevational view looking in the direction of the arrows 2—2 of FIG. 1.
Figure 3:
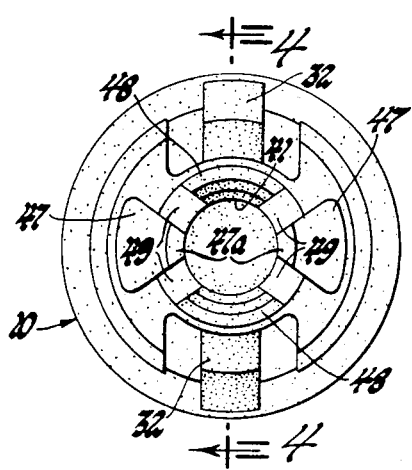
FIG. 3 is an enlarged end elevational view of the unitary lens structure shown in FIG. 1.

As representing a preferred embodiment of the present invention, FIG. 1 of the drawings shows a unitary lens structure 10 of a fiber optic assembly 12 and which is detachably connected to an instrument panel 14 of an automotive vehicle (not shown). The lens structure 10 is made from a suitable hard or substantially rigid plastic material, such as polycarbonate. The unitary lens structure 10 comprises a unitary body 16 having a forward socket portion 17 and a rearward socket portion 18. The forward and rearward socket portions 17 and 18 have a common bottom wall 19. The bottom wall 19 has a planar rearward end face 19a and a convex forward end face 19b and defines a lens or lens portion for concentrating light being transmitted through the fiber optic assembly 12.

Figure 4:
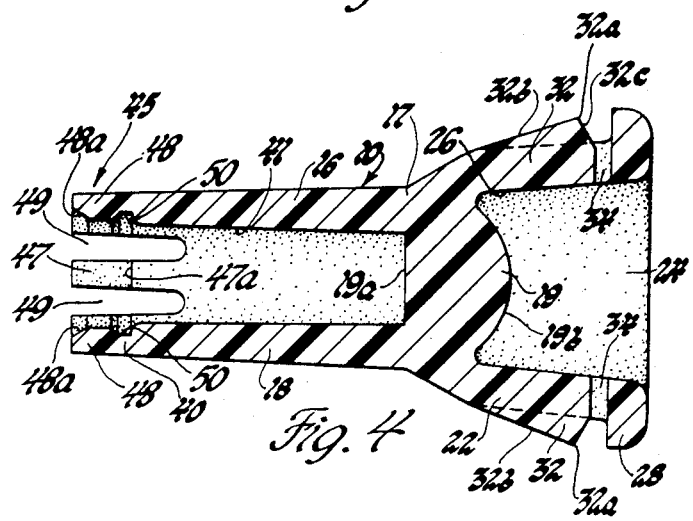
FIG. 4 is a cross sectional view taken approximately along line 4—4 of FIG. 3.
Figure 5:
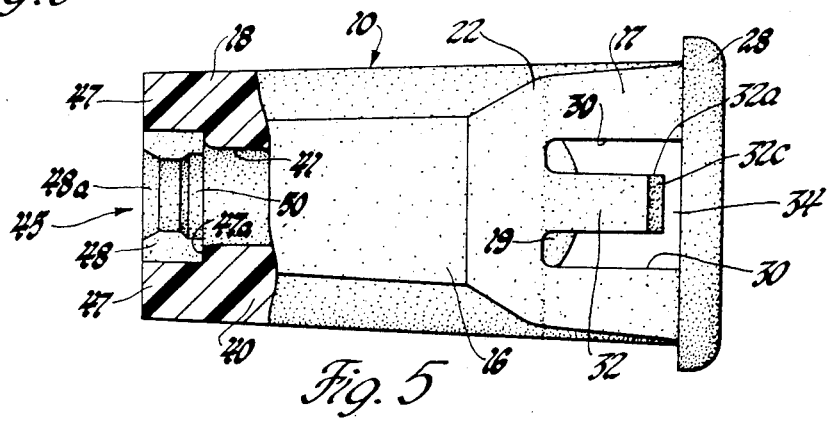
FIG. 5 is a side elevational view with parts shown in section of the unitary lens structure shown in FIG. 1.
Figure 6:
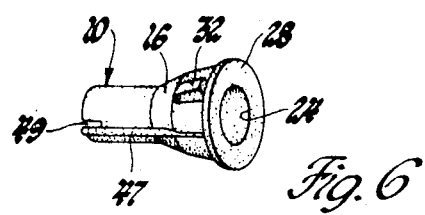
FIG. 6 is a reduced perspective view of the unitary lens structure shown in FIG. 1.

The forward socket portion 17 has a side or generally annular side wall 22 which defines an axially extending recess 24 through which the lens portion 19 can be viewed by an operator of the vehicle when the latter is attached to the instrument panel 14. As best shown in FIGS. 1 and 4, the side wall 22 has an inner surface 26 which is progressively tapered radially inwardly preceding from the forward end of the forward socket portion 17 toward the lens portion 19 to provide a tapered recess 24. By having the lens portion 19 recessed, ambient light will not wash out the light being transmitted by the lens portion 19.

The side wall 22 of the forward socket portion 17 has an annular flange 28 at its forward end. The flange 28 has a diameter which is greater than the nominal or given diameter of the aperture 14a in the instrument panel 14 and abuts the outer side of the instrument panel 14 when the lens structure is connected thereto. The side wall 22 also has a pair of U-shaped slots 30 at diametral opposite locations. The U-shaped slots 30 define a pair of deflectable fingers 32 whose rearward ends are integral with the side wall 22 at its juncture with the bottom wall 19. The fingers 32 have their forward ends spaced from the annular flange 28 to define spaces or slots 34 for receiving the panel 14. The fingers 32 at their outermost points 32a lie on a circumscribed circle having a diameter which is slightly greater than the nominal or given diameter of the aperture 14a in the panel 14. Although the unitary lens structure 10 is made from a substantially rigid or hard plastic material, the fingers 32 by virtue of being supported in cantilever fashion are nevertheless sufficiently flexible so that they can be deflected radially inwardly and outwardly.

The fingers 32 cooperate with the annular flange 28 to secure the unitary lens structure 10 to the panel 14. The lens structure 10 is adapted to be attached to the panel 14 by inserting the same rearward end first, to the left as viewed in FIG. 1. As the lens structure 10 is inserted through the aperture 14a the fingers 32 will engage the edge of the panel 14 which defines the opening 14a and be caused to be deflected radially inwardly from their normal free state position, as shown in the solid lines in FIG. 1, toward a position, as shown by the phantom lines in FIG. 1. As shown in FIG. 1, the fingers 32 have tapered rearward sides 32b to facilitate their being deflected radially inwardly by the edge of the panel defining the opening 14a. As the lens structure 10 is further inserted through the opening 14a, the fingers 32 continue to move radially inwardly until the panel 14 is aligned with the spaces 34 whereupon they will return, due to their inherent elasticity, towards their normal free state position, as shown by the solid lines in FIG. 1. In this position the flange 28 abuts the panel 14 and the fingers 32 abut the opposite side of the panel 14 to securely retain the lens structure 10 connected to the panel 14.

To prevent the lens structure 10 from rattling due to vibrationally imposed forces when connected to the panel 14, an anti rattle feature is provided. To this end, the fingers 32 include planar tapered or beveled surfaces 32c at their forward ends. The tapered surfaces 32c taper radially inwardly of the side wall 22 and axially toward the flange 28. The fingers 32 engage the edge of the panel defining the opening 14a along the surfaces 32c. Thus, irrespective of the tolerance variations, within limits, in the width of the space 34, the size of the aperture 14a and the thickness of the panel 14, the tapered surfaces 32 of the fingers 32 insure that the lens structure will be securely connected to the panel 14 such that rattling of the lens structure 10 will not occur.

The rearward socket portion 18 has an annular side wall 40 which defines with the bottom wall 19 an axially extending recess 41 for receiving one end of a fiber optic bundle 42. The fiber optic bundle 42 has an end connector 44 in the form of a ferrule crimped thereon. The rearward socket portion 18 also includes a retaining means 45 for cooperably engaging a circumferentially extending flange 44a on the end connector 44 for retaining the same within the rearward socket portion 18 and at a location such that the end of the fiber optic bundle 42 will be spaced a predetermined distance or proper focal length from the rearward surface 19a of the lens 19 so as to provide for maximum concentration of light through the lens 19.

The retaining means 45 comprises a pair of alternately spaced rigid and deflectable fingers 47 and 48 at the rearward end of the rearward socket portion 18, the fingers 47 and 48 being separated by slots 49. The rigid fingers 47 have a radially inwardly extending shoulder or abutment 47a intermediate their ends which is adapted to be engaged by the flange 44a of the end connector 44 when the latter is inserted in the rearward socket portion 18 to prevent over insertion of the end connector 44 and to space the forward end of the fiber optic bundle 42 at the proper focal length from the lens 19. The deflectable fingers 48 of the rearward socket portion 18 each have a circumferentially extending groove 50 therein for receiving the flange 44a of the end connector 44. The deflectable fingers also have tapered entry portions 48a to facilitate insertion of the end connector 44 within the rearward socket portion 18.

The end connector 44 is connected to the rearward socket portion 18 by inserting the same therein. As the end connector is inserted therein, the flange 44a of the end connector 44 engages the tapered entry portions 48a of the deflectable fingers 48 to cause the same to be moved radially outwardly from their normal free state position, as shown in FIG. 4, until the flange 44a is aligned with the grooves 50 whereupon the fingers 48 will contract toward their normal free state position whereby the fingers 48 will engage the opposite sides of the flange 44a to securely retain the end connector 44 within the rearward socket portion 18.

From the foregoing, it should be apparent that a novel lens structure has been provided for concentrating light being transmitted from a fiber optic bundle and whose visual indication of when light is being transmitted is not effected by ambient light. It should also be apparent that the novel lens structure has been provided which is readily attachable to a panel and in a manner such that no rattling will occur irrespective of the tolerance variations, within limits, in the lens structure and in the panel.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A unitary lens structure for concentrating light being transmitted through a fiber optic bundle and which is adapted to be connected to an end connector of the fiber optic bundle and to an apertured panel comprising: a body having a forward socket portion and a rearward socket portion, said forward and rearward socket portions having a common bottom wall, said bottom wall having a convex forward end face and defining a lens portion for concentrating light being transmitted through the fiber optic bundle, said forward socket portion having a side wall which defines with said bottom wall an axially extending recess through which the lens portion can be viewed, said side wall having a flange adjacent its forward end which extends transversely of said side wall and which is adapted to engage one side of the panel when connected thereto, said side wall including deflectable means having a forward end axially spaced from said flange means to define a space for receiving the panel, said deflectable mans being adapted to be deflected inwardly from its normal free state position when said lens structure is inserted rearward end first through the apertured panel until the latter is received in said space whereupon the deflectable means returns toward its normal position to retain the lens structure on the panel, said rearward socket portion including retaining means adapted to retain the end connector and fiber optic bundle therein and at a predetermined distance from said lens.

2. A lens structure as defined in claim 1 wherein said deflectable means comprises deflectable fingers at diametral opposite locations of said side wall, wherein said fingers have their forward ends spaced from said flange and with the forward ends of the fingers being tapered inwardly toward said flange whereby said tapered ends of the fingers are adapted to engage the panel at its edge around the aperture when connected thereto.

3. A unitary lens structure for concentrating light being transmitted through a fiber optic bundle and which is adapted to be detachably connected to an end connector secured to a fiber optic bundle and to a panel having an aperture of a given diameter, said lens structure comprising: a body made from a substantially rigid, plastic material and having a generally annular forward socket portion and a rearward socket portion, said forward and rearward socket portions having a common bottom wall, said bottom wall having a planar rearward face and a convex forward face and defining a lens portion for concentrating light being transmitted through the fiber optic bundle, said forward socket portion having a side wall which defines with the bottom wall an axially extending recess through which the lens portion can be viewed, said side wall having an annular flange extending radially outwardly thereof adjacent its forward end, said flange having an outer diameter which is greater than the given diameter of the aperture in the panel to which it is adapted to be connected and being engageable with one side of the panel when the lens structure is connected thereto, said side wall having a pair of U-shaped slots at diametral opposite locations and which define deflectable fingers having their forward ends spaced from the flange, said fingers having their outermost points lying on a circumscribed circle having a diameter greater than the diameter of the aperture in the panel to which the lens structure is adapted to be connected, said fingers being adapted to be deflected inwardly from their normal free state position by said panel when said lens structure is inserted rearward end first through said aperture until they clear said panel whereupon they return toward their normal position to engage the panel to connect the lens structure thereto, said fingers at their forward ends having planar surfaces which taper radially inwardly of the side wall and axially toward said flange and which are adapted to engage the panel at its edge around the aperture when the lens structure is connected to said panel so that the lens structure will not rattle irrespective of tolerance variations, within limits, in the size of the aperture and thickness of the panel, said rearward socket portion including retaining means adapted to retain the end connector and fiber optic bundle therein and at a predetermined distance from said planar rearward end face of said bottom wall.

4. A unitary lens structure as defined in claim 3 wherein said rearward socket portion is adapted to receive a circumferentially flanged end connector secured to a fiber optic bundle, and wherein said retaining means of said rearward socket portion comprises alternately spaced rigid and deflectable axially extending fingers, said rigid fingers having transverse abutment surfaces which are adapted to engage the flange of the end connector of the fiber optic bundle to prevent overinsertion of the end connector into the rearward socket portion, said deflectable fingers of said rearward socket portion having circumferentially extending grooves therein and tapered entry portions, said deflectable fingers of said rearward socket portion being adapted to be deflected radially outwardly from their normal position when the end connector engages the tapered entry portions upon being inserted therein until said flange of said end connector is aligned with said grooves whereupon said fingers will return toward their normal position and engage the flange at its opposite sides to retain the end connector within the rearward socket portion when connected thereto.

5. In combination, a panel having an aperture therein of a given diameter, a unitary lens structure detachably connected to said panel and a circumferentially flanged end connector of a fiber optic bundle detachably connected to said lens structure, said lens structure comprising: a body having a forward socket portion and a rearward socket portion, said forward and rearward socket portions having a common bottom wall, said bottom wall having a planar rearward face and a convex forward face, said bottom wall defining a lens portion for concentrating light being transmitted through said fiber optic bundle, said forward socket portion having a side wall which defines with the bottom wall an axially extending recess through which the lens portion can be viewed, said side wall having a flange extending radially outwardly of said side wall adjacent its forward end, said flange having an outer diameter which is greater than the given diameter of the aperture in the panel and being engageable with one side of the panel when the lens structure is connected thereto, said side wall having a pair of U-shaped slots at diametral opposite locations and which define deflectable fingers having their forward ends spaced from the flange, said fingers having their outermost points lying on a circumscribed circle having a diameter greater than the diameter of said aperture in said panel, said fingers being deflectable inwardly from their normal free state position by said panel when said lens structure is inserted rearward end first in said aperture until they clear said aperture whereupon they return toward their normal position and engage the panel to connect the lens structure to the panel, said fingers at their forward ends having planar surfaces which taper radially inwardly toward said flange and engage the panel at its edge around the aperture whereby said lens structure when connected to said panel will not rattle irrespective of tolerance variations, within limits, in the dimensions of the lens structure and panel, said rearward socket portion adjacent its rearward end having alternately spaced rigid and deflectable axially extending fingers, said rigid fingers having transverse abutment surfaces for engaging the flange of the end connector of the fiber optic bundle to prevent overinsertion of the end connector in the rearward socket portion, said deflectable fingers of said rearward socket portion having circumferentially extending grooves therein, said deflectable fingers of the rearward socket portion being deflected radially outwardly from their normal free state position when said end connector is inserted therein until said flange is aligned with said grooves whereupon said fingers move radially inwardly toward their normal position to engage the flange at its opposite sides to retain the end connector within the rearward socket portion and to space the fiber optic bundle a fixed distance from the rearward face of said lens.

* * * * *